United States Patent
Yang

(10) Patent No.: US 8,553,622 B2
(45) Date of Patent: Oct. 8, 2013

(54) APPARATUS AND METHOD FOR SUPPRESSING INTERFERENCE CAUSED BY COEXISTENCE OF WIMAX AND WIFI

(75) Inventor: Jiaojiao Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 20 days.

(21) Appl. No.: 13/258,765

(22) PCT Filed: May 14, 2010

(86) PCT No.: PCT/CN2010/072811
§ 371 (c)(1),
(2), (4) Date: May 30, 2012

(87) PCT Pub. No.: WO2010/148825
PCT Pub. Date: Dec. 29, 2010

(65) Prior Publication Data
US 2012/0230252 A1    Sep. 13, 2012

(30) Foreign Application Priority Data
Dec. 4, 2009  (CN) .......................... 2009 1 0242202

(51) Int. Cl.
*H04W 4/00* (2009.01)
*H04B 1/10* (2006.01)
*H04B 7/08* (2006.01)
*H04M 1/00* (2006.01)

(52) U.S. Cl.
USPC ......... 370/328; 375/350; 455/132; 455/552.1

(58) Field of Classification Search
None
See application file for complete search history.

(56) References Cited

U.S. PATENT DOCUMENTS

| 7,532,867 | B1 * | 5/2009 | Mo et al. .......................... 455/78 |
| 2008/0089350 | A1 * | 4/2008 | Liu et al. ....................... 370/401 |

(Continued)

FOREIGN PATENT DOCUMENTS

| CN | 101272296 A | 9/2008 |
| CN | 201303421 Y | 9/2009 |
| CN | 101594669 A | 12/2009 |

OTHER PUBLICATIONS

International Search Report in international application No. PCT/CN2010/072811, mailed on Sep. 9, 2010.

(Continued)

*Primary Examiner* — Clemence Han
(74) *Attorney, Agent, or Firm* — Oppedahl Patent Law Firm LLC

(57) ABSTRACT

The disclosure provides an apparatus and method for suppressing interference caused by coexistence of World Interoperability for Microwave Access (WiMAX) and Wireless Fidelity (WiFi). When a user receives the RF signal from a wireless network by using the apparatus, a WiMAX filtering module filters out the WiFi RF signal received through a WiMAX antenna; the WiMAX RF signal is converted into the WiFi RF signal, and the out-of-band interference signal from the WiFi RF signal is filtered out by a WiFi filtering module, then the filtered WiFi RF signal is transmitted to the user through a WiFi antenna. When the user transmits the RF signal to a wireless network by using the apparatus, a WiFi filtering module filters out the WiMAX RF signal received through the WiFi antenna, the WiFi RF signal is converted into the WiMAX RF signal, and the out-of-band interference signal from the WiMAX RF signal is filtered out by the WiMAX filtering module, the filtered WiMAX RF signal is transmitted to the wireless network through the WiMAX antenna. The disclosure reduces the interference between WiMAX and WiFi, increases the data transmission rate, and avoids the waste of frequency spectrum resources.

19 Claims, 4 Drawing Sheets

(56) References Cited

U.S. PATENT DOCUMENTS

2008/0219389 A1* 9/2008 Nisbet .......................... 375/348
2008/0304600 A1* 12/2008 Bottomley ................... 375/340
2010/0109778 A1* 5/2010 Ichitsubo et al. ............ 330/285
2013/0080495 A1* 3/2013 Staszewski et al. .......... 708/670

OTHER PUBLICATIONS

English Translation of the Written Opinion of the International Search Authority in international application No. PCT/CN2010/072811, mailed on Sep. 9, 2010.

* cited by examiner

APPARATUS AND METHOD FOR SUPPRESSING INTERFERENCE CAUSED BY COEXISTENCE OF WIMAX AND WIFI

TECHNICAL FIELD

The disclosure relates to an interference suppression technique in a wireless network, in particular to an apparatus and method for suppressing the interference caused by coexistence of WiMAX and WiFi when WiMAX and WiFi coexist.

BACKGROUND

As a metropolitan area network technique, World Interoperability for Microwave Access (WiMAX) is based on the 802.16 series of wireless standards, and particularly the 802.16d and 802.16e wireless standards and the working frequency bands are 2.3 GHz, 2.5 GHz and 3.5 GHz. One base station can provide a maximum downlink data transmission rate of 40 Mbps for multiple fixed users within a radius of 3 km to 10 km and a maximum downlink data transmission rate of 15 Mbps for multiple mobile users within a radius of 3 km. The greatest advantages of WiMAX are wide coverage working distances and availability in mobile environments such as automobiles and cruises.

Wireless fidelity (WiFi) is a short-range radio transmission technique based on the IEEE 802.11b standard. WiFi supports radio signals accessed from the Internet within hundreds of feet. The greatest advantages of WiFi are high transmission speed, which may be as high as 11 Mbps. Additionally, wiring is not needed for WiFi. Since it is not limited to conditions of wiring, it is quite suitable for mobile office users.

Along with the development of the WiMAX technology, WiMAX users propose a new demand for facilitating household use. That is, WiMAX and WiFi are combined, a Customer Premises Equipment (CPE) wirelessly connected with an external WiMAX is used in the home, to transmit videos and data broadband contents received through WiMAX to devices, such as a set-top box, a mobile phone and a PC, through WiFi, such that the user can view or use them. The frequency band used by 802.11b/g WiFi is 2400 MHz-2483.5 MHz, and the channels used are channels 1-13, with a bandwidth of 22 MHz for each channel; the frequency band used by the 2.5 GHz-WiMAX is 2496 MHz-2690 MHz and the bandwidth of the channel commonly used is 5 MHz or 10 MHz. It can be seen that the interval between the frequency bands used by the 2.5 GHz-WiMAX and WiFi is about 13 MHz; the frequency band used by the 2.3 GHz-WiMAX is 2300 MHz-2400 MHz and the bandwidth of the channel commonly used is 8.75 MHz. It can be seen that the frequency bands used by the 2.3 GHz-WiMAX and WiFi are overlapped at sidebands. In view of the above analysis, when WiMAX and WiFi coexist, interference between WiMAX Radio Frequency (RF) signals and WiFi RF signals is prone to occur, which greatly reduces the data transmission rate.

In the prior art, the band interval between the frequency bands used by WiMAX and WiFi is generally enlarged by reducing the frequency bands used by WiMAX and WiFi, in order to decrease the interference between WiMAX RF signals and WiFi RF signals as much as possible. For example, the frequency band used by WiMAX is limited to 2525 MHz-2690 MHz, or the frequency band used by WiFi is limited to 2400 MHz-2452 MHz. Unfortunately, although the above method can decrease the interference between WiMAX RF signals and WiFi RF signals, it wastes mass frequency spectrum resources.

SUMMARY

Therefore, the main purpose of the disclosure is to provide an apparatus and method for suppressing interference caused by coexistence of WiMAX and WiFi, in order to decrease the interference between RF signals when WiMAX and WiFi coexist and avoid the waste of frequency spectrum resources.

In order to achieve the above purpose, the technical solution of the disclosure is realized as follows:

the disclosure provides an apparatus for suppressing interference caused by coexistence of World Interoperability for Microwave Access (WiMAX) and Wireless Fidelity (WiFi), by which a user receives a Radio Frequency (RF) signal from a wireless network and transmits an RF signal to the wireless network, the device comprises: a WiMAX antenna, a WiMAX filtering module, a WiFi antenna and a WiFi filtering module; wherein the WiMAX antenna is configured to receive a WiMAX RF signal from the wireless network, and transmit the WiMAX RF signal to the wireless network;

the WiMAX filtering module is configured to filter out a WiFi RF signal received through the WiMAX antenna, and filter out an out-of-band interference signal from the WiMAX RF signal from a WiMAX RF module;

the WiFi antenna is configured to transmit a WiFi RF signal to the user; and receive the WiFi RF signal transmitted by the user;

the WiFi filtering module is configured to filter out an out-of-band interference signal from the WiFi RF signal from a WiFi RF module, and filter out the WiMAX RF signal received through the WiFi antenna from the user.

In the solution, the WiMAX filtering module may specifically be a WiMAX band pass filter or a WiFi band stop filter; the WiFi filtering module may specifically be a WiFi band pass filter or a WiMAX band stop filter.

In the solution, the WiMAX antenna may specifically be a WiMAX omni-directional antenna; the WiFi antenna may specifically be a WiFi directional antenna.

In the solution, a position difference may exist between the WiFi directional antenna and the WiMAX omni-directional antenna, resulting in maximum horizontal and vertical distances between the WiFi directional antenna and the WiMAX omni-directional antenna, and the maximum horizontal and vertical distances may ensure no overlap between the WiFi directional antenna and the WiMAX omni-directional antenna in their maximum radiation direction.

In the solution, the apparatus may further comprises: the WiMAX RF module, a WiMAX integrated processor, a WiFi integrated processor, the WiFi RF module, an application processing module, a storage module and a power management module; wherein the WiMAX RF module is configured to optimize and amplify uplink and downlink WiMAX RF signals;

the WiMAX integrated processor is configured to demodulate the downlink WiMAX RF signal optimized and amplified by the WiMAX RF module into data information and transmit the data information to the application processing module, and modulate the data information from the application processing module into the uplink WiMAX RF signal and transmit the uplink WiMAX RF signal to the WiMAX RF module;

the WiFi integrated processor is configured to modulate the data information from the application processing module into a downlink WiFi RF signal and transmit the downlink WiFi RF signal to the WiFi RF module, and demodulate an uplink WiFi RF signal optimized and amplified by the WiFi RF module into data information and transmit the data information to the application processing module;

the WiFi RF module is configured to optimize and amplify the uplink and downlink WiFi RF signals;

the application processing module is configured to convert the data information from the WiMAX integrated processor into data information that the WiFi integrated processor is capable of properly identifying and processing and transmit the data information to the WiFi integrated processor; and convert the data information from the WiFi integrated processor into data information that the WiMAX integrated processor is capable of properly identifying and processing and transmit the data information to the WiMAX integrated processor;

the storage module is configured to store software required for operation of the application processing module and drivers of the respective modules;

the power management module is configured to transform an external power to stable powers required by the respective modules.

In the solution, the WiMAX RF module may support RF signal processing for 2.5 GHz-band-WiMAX and 2.3 GHz-band-WiMAX; the WiFi RF module may support RF signal processing for 2.4 GHz-band-WiFi.

In the solution, the application processing module may further be configured to call a program in the storage module when the device is started, to load the drivers of the respective modules.

The disclosure also provides a method for suppressing interference caused by coexistence of WiMAX and WiFi, comprising:

when a user receives an RF signal from a wireless network by using the apparatus, the WiMAX filtering module filters out a WiFi RF signal received through a WiMAX antenna; a WiMAX RF signal is converted into a WiFi RF signal, then an out-of-band interference signal from the WiFi RF signal is filtered out by the WiFi filtering module, and the filtered WiFi RF signal is transmitted to the user through the WiFi antenna;

when the user transmits an RF signal to the wireless network by using the apparatus, the WiFi filtering module filters out a WiMAX RF signal received through the WiFi antenna from the user, a WiFi RF signal is converted into a WiMAX RF signal, then an out-of-band interference signal from the converted WiMAX RF signal is filtered out by the WiMAX filtering module, and the filtered WiMAX RF signal is transmitted to the wireless network through the WiMAX antenna.

In the solution, the step that the WiMAX RF signal is converted into the WiFi signal may specifically comprise: the WiMAX RF signal received through the WiMAX antenna is optimized, amplified and demodulated, and then the optimized, amplified and demodulated WiMAX RF signal is converted into data information that the user is capable of identifying; the data information that the user is capable of identifying is converted into data information that the WiFi integrated processor is capable of properly identifying and processing, and the data information that the WiFi integrated processor is capable of properly identifying and processing is modulated into a WiFi RF signal, the modulated WiFi RF signal is optimized and amplified, and then the optimized and amplified WiFi RF signal is transmitted to the WiFi filtering module.

In the solution, the step that the WiFi RF signal is converted into the WiMAX RF signal may specifically comprise: the WiFi RF signal received through the WiFi antenna is optimized, amplified and demodulated, and then the optimized, amplified and demodulated WiFi RF signal is converted into data information that the user is capable of identifying; the data information that the user is capable of identifying is converted into data information that the WiMAX integrated processor is capable of properly identifying and processing, and the data information that the WiMAX integrated processor is capable of properly identifying and processing is modulated into a WiMAX RF signal, the modulated WiMAX RF signal is optimized and amplified, and then the optimized and amplified WiMAX RF signal is transmitted to the WiMAX filtering module.

The apparatus and method for suppressing the interference caused by coexistence of WiMAX and WiFi in the disclosure are characterized in that: when a user receives the RF signal from a wireless network by using the apparatus, the WiMAX filtering module filters out the WiFi RF signal received through the WiMAX antenna; the WiMAX RF signal is converted into the WiFi RF signal, then the out-of-band interference signal from the WiFi RF signal is filtered out by the WiFi filtering module, then the filtered WiFi RF signal is transmitted to the user through the WiFi antenna; when the user transmits the RF signal to the wireless network by using the apparatus, the WiFi filtering module filters out the WiMAX RF signal received through the WiFi antenna, the WiFi RF signal is converted into the WiMAX RF signal, and then the out-of-band interference signal from the WiMAX RF signal is filtered out by the WiMAX filtering module, and the filtered WiMAX RF signal is transmitted to the wireless network through the WiMAX antenna, in order to increase the data transmission rate.

The apparatus and the method in the disclosure effectively decrease the interference between RF signals when WiMAX and WiFi coexist, increase the data transmission rate by 4-5 times, and avoid the waste of frequency spectrum resources.

DETAILED DESCRIPTION

The basic principle of the disclosure is as follows: when a user receives an RF signal from a wireless network by using the apparatus, a WiMAX filtering module filters out the WiFi RF signal received through a WiMAX antenna; the WiMAX RF signal is converted into the WiFi RF signal, and the out-of-band interference signal from the WiFi RF signal is filtered out by a WiFi filtering module, then the WiFi RF signal is transmitted to the user through a WiFi antenna; when the user transmits an RF signal to the wireless network by using the apparatus, the WiFi filtering module filters out the WiMAX RF signal received through the WiFi antenna, the WiFi RF signal is converted into the WiMAX RF signal, and the out-of-band interference signal from the WiMAX RF signal is filtered out by the WiMAX filtering module, the WiMAX RF signal is transmitted to the wireless network through the WiMAX antenna.

Figure 1:
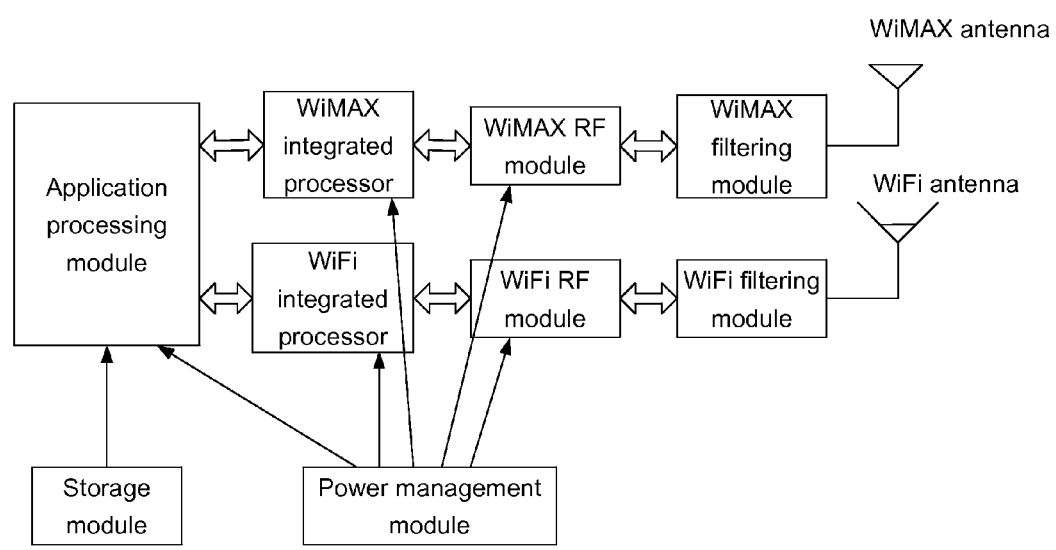
FIG. 1 shows a diagram illustrating structure of an apparatus for suppressing the interference caused by coexistence of WiMAX and WiFi according to the disclosure.

As shown in FIG. 1, the apparatus for suppressing the interference caused by coexistence of WiMAX and WiFi in the disclosure comprises: a WiMAX antenna, a WiMAX filtering module, a WiFi antenna and a WiFi filtering module; wherein all modules of the apparatus are arranged in the CPE to implement the wireless transmission between the wireless network and the user; the process that the user receives the RF signal from a wireless network by using the apparatus is specifically as follows: the apparatus receives the WiMAX RF signal from the wireless network through the WiMAX antenna, converts the RF signal into WiFi RF signal that can be identified by the user, and then transmits the WiFi RF signal to the user through the WiFi antenna; the process that the user transmits the RF signal to the wireless network by using the apparatus is specifically as follows: the apparatus receives the WiFi RF signal transmitted by the user through the WiFi antenna, converts the RF signal into the WiMAX RF signal that can be identified by the wireless network, and then transmits the WiMAX RF signal to the wireless network through the WiMAX antenna.

The WiMAX antenna is configured to receive the WiMAX RF signal from the wireless network when the user receives the RF signal from the wireless network by using the apparatus; and transmit the WiMAX RF signal to the wireless network when the user transmits the RF signal to the wireless network by using the apparatus; the WiMAX filtering module, located in a WiMAX RF channel, is configured to filter out the WiFi RF signal received through the WiMAX antenna when the user receives the RF signal from the wireless network by using the apparatus; and filter out the out-of-band interference signal from the WiMAX RF signal from the WiMAX RF module when the user transmits the RF signal to the wireless network by using the apparatus;

the WiFi antenna is configured to transmit the WiFi RF signal to the user when the user receives the RF signal from the wireless network by using the apparatus; and receive the WiFi RF signal transmitted by the user when the user transmits the RF signal to the wireless network by using the apparatus;

the WiFi filtering module, located in a WiFi RF channel, is configured to filter out the out-of-band interference signal from the WiFi RF signal from a WiFi RF module when the user receives the RF signal from the wireless network by using the apparatus; and filter out the WiMAX RF signal received through the WiFi antenna from the user when the user transmits the RF signal to the wireless network by using the apparatus.

The WiMAX filtering module is a WiMAX band pass filter or a WiFi band stop filter with high suppression ratio; the WiFi filtering module is specifically a WiFi band pass filter or a WiMAX band stop filter with high suppression ratio.

The WiMAX antenna may be a WiMAX omni-directional antenna; the WiFi antenna may be a WiFi directional antenna.

Figure 2:
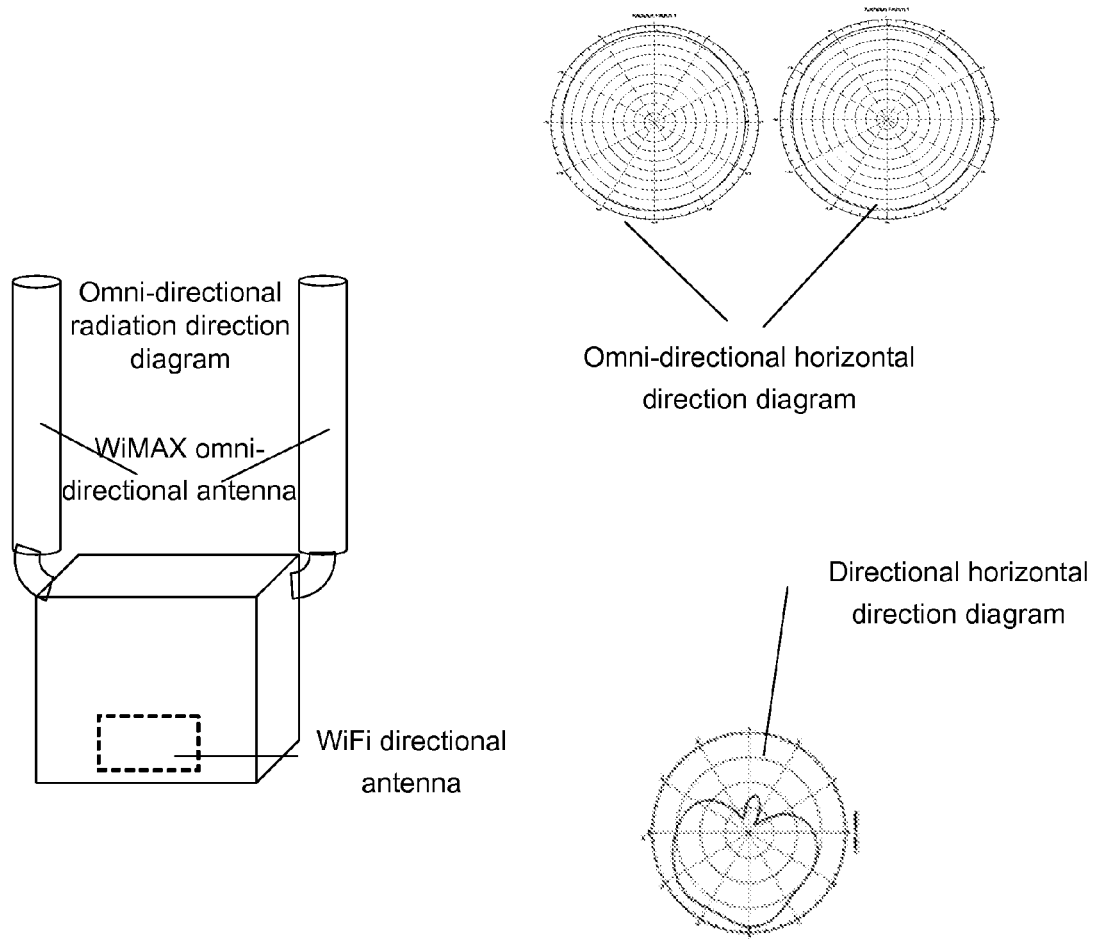
FIG. 2 shows a diagram illustrating the position relationship and radiation directions of a WiMAX omni-directional antenna and a WiFi directional antenna in the apparatus for suppressing the interference caused by coexistence of WiMAX and WiFi according to the disclosure.

In the apparatus, as WiMAX is mainly used for network covering of large scales such as cities, in order to achieve better covering effect, herein the WiMAX omni-directional antenna is employed to receive and transmit RF signals, and according to the features of dual-receiving and dual-transmitting of WiMAX, the apparatus is provided with two WiMAX omni-directional antennas, as shown in FIG. 2; WiFi is mainly used for network covering of small scales such as houses, in order to decrease the interference between WiMAX RF signals and WiFi RF signals effectively, the WiFi directional antenna is employed herein.

In the solution, a position difference exists between the WiFi directional antenna and the WiMAX omni-directional antenna, which results in a maximum horizontal distance and a maximum vertical distance between the two antennas according to the structure of appearance of the apparatus, that is, the position difference ensures no overlap between the two antennas in their maximum radiation direction, in order to decrease the interference between WiFi signals and WiMAX signals effectively.

In the solution, the apparatus further comprises: a WiMAX RF module, a WiMAX integrated processor, a WiFi integrated processor, a WiFi RF module, an application processing module, a storage module and a power management module; wherein the WiMAX RF module is configured to optimize and amplify uplink and downlink WiMAX RF signals, the uplink WiMAX RF signal refers to the WiMAX RF signal received through the WiMAX omni-directional antenna; the downlink WiMAX RF signal refers to the WiMAX RF signal from the WiMAX integrated processor; when the user receives the RF signal from the wireless network by using the apparatus, the WiMAX RF signal received through the WiMAX omni-directional antenna is optimized and amplified, when the user transmits the RF signal to the wireless network by using the apparatus, the WiMAX RF signal from the WiMAX integrated processor is optimized and amplified;

the WiMAX integrated processor is configured to demodulate the downlink WiMAX RF signal optimized and amplified by the WiMAX RF module into data information and transmit the data information to the application processing module when the user receives the RF signal from the wireless network by using the apparatus; and modulate the data information from the application processing module into the uplink WiMAX RF signal and transmit the uplink WiMAX RF signal to the WiMAX RF module when the user transmits the RF signal to the wireless network by using the apparatus;

the WiFi integrated processor is configured to modulate the data information from the application processing module into downlink WiFi RF signal and transmit the downlink WiFi RF signal to the WiFi RF module when the user receives the RF signal from the wireless network by using the apparatus; and demodulate the uplink WiFi RF signal optimized and amplified by the WiFi RF module into data information and transmit the data information to the application processing module when the user transmits the RF signal to the wireless network by using the apparatus;

the WiFi RF module is configured to optimize and amplify uplink and downlink WiFi RF signals, the uplink WiFi RF signal refers to the WiFi RF signal from the WiFi integrated processor; the downlink WiFi RF signal refers to the WiFi RF signal received through the WiFi directional antenna; that is, when the user receives the RF signal from the wireless network by using the apparatus, the WiFi RF signal from the WiFi integrated processor is optimized and amplified; when the user transmits the RF signal to the wireless network by using the apparatus, the WiFi RF signal received through the WiFi directional antenna is optimized and amplified;

the application processing module is configured to convert the data information from the WiMAX integrated processor into data information that can be identified and processed properly by the WiFi integrated processor and transmit the data information to the WiFi integrated processor when the user receives the RF signal from the wireless network by using the apparatus; and convert the data information from the WiFi integrated processor into data information that can be identified and processed properly by the WiMAX integrated processor and transmit the data information to the WiMAX integrated processor when the user transmits the RF signal to the wireless network by using the apparatus;

the storage module is configured to store software required for operation of the application processing module and drivers of the respective modules;

the power management module is configured to transform an external power to stable powers required by the respective modules.

In the solution, the application processing module is further configured to call the programs in the storage module when the device is started, to load the drivers of the respective modules, such that the respective modules can work normally;

in the solution, the WiMAX RF module may support RF signal processing for 2.5 GHz/2.3 GHz-band-WiMAX, the WiMAX RF module and the WiMAX integrated processor complete the wireless access of WiMAX together;

in the solution, the WiFi RF module may support RF signal processing for 2.4 GHz-band-WiFi, the WiFi RF module and the WiFi integrated processor complete the wireless access of WiFi together.

Figure 3:
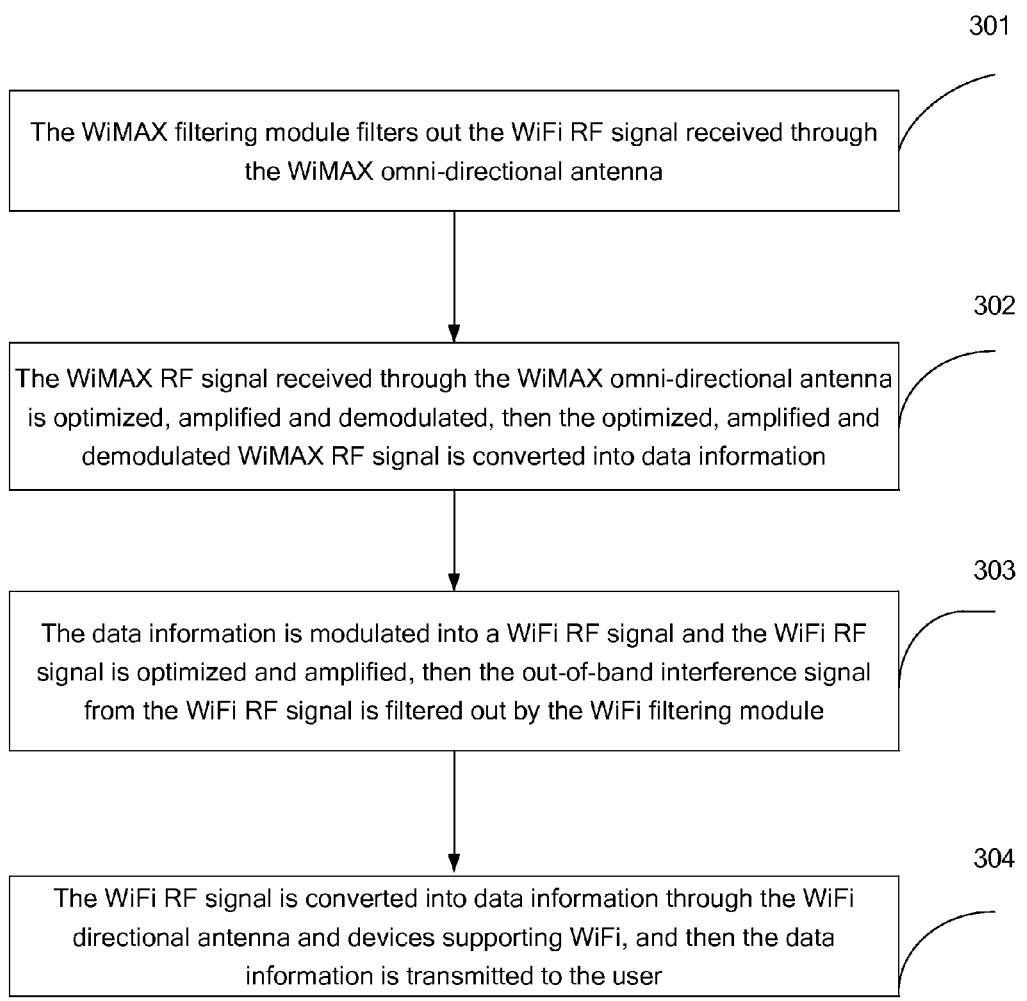
FIG. 3 shows a flow chart of a method for suppressing the interference caused by coexistence of WiMAX and WiFi according to the disclosure, when a user receives an RF signal from a wireless network by using the apparatus.

Based on the apparatus, the disclosure provides a method for suppressing interference caused by coexistence of WiMAX and WiFi, when the user receives the RF signal from the wireless network by using the apparatus, as shown in FIG. 3, comprising the following steps:

step 301: the WiMAX filtering module filters out the WiFi RF signal received through the WiMAX omni-directional antenna;

in this step, when the user receives the RF signal from the wireless network by using the apparatus, the WiMAX omni-directional antenna receives the WiMAX RF signal from the wireless network, as the band interval between frequency bands used by WiMAX and WiFi is small, the WiMAX omni-directional antenna is unable to perform suppression on the WiFi RF signal during reception, therefore the WiMAX RF signal received through the WiMAX omni-directional antenna may include the WiFi RF signal, the WiFi RF signal is filtered out by the WiMAX filtering module, specifically like a WiMAX band pass filter or a WiFi band stop filter, to suppress the WiFi RF signal effectively and prevent the WiFi RF signal from interfering the receiving system of the WiMAX RF module;

step 302: the WiMAX RF signal received through the WiMAX omni-directional antenna is optimized, amplified and demodulated, then the optimized, amplified and demodulated WiMAX RF signal is converted into data information;

in this step, the filtered WiMAX RF signal is transmitted to the WiMAX RF module, optimized and amplified by the WiMAX RF module, and is then transmitted to the WiMAX integrated processor; the WiMAX integrated processor demodulates the optimized and amplified WiMAX RF signal into data information that can be identified by the user and transmits the data information to the application processing modules; the application processing modules converts the received data information into data information that can be identified and processed properly by the WiFi integrated processor and transmits the data information to the WiFi integrated processor;

step 303: the data information is modulated into the WiFi RF signal and the WiFi RF signal is optimized and amplified, then the out-of-band interference signal from the WiFi RF signal is filtered out by the WiFi filtering module;

in this step, the WiFi integrated processor modulates the received data information and converts the received data information into the WiFi RF signal that can be amplified and transmitted by the WiFi RF module, and transmits the WiFi RF signal to the WiFi RF module, the WiFi RF signal is optimized and amplified by the WiFi RF module and then transmitted to the WiFi filtering module; the WiFi filtering module, specifically like a WiFi band pass filter or a WiMAX band stop filter, filters the received WiFi RF signal, to effectively reduce the out-of-band interference signal from the WiFi RF signal resulted from poor out-of-band suppression of the WiFi RF module;

step 304: the WiFi RF signal is converted into data information through the WiFi directional antenna and a device supporting WiFi, and then the data information is transmitted to the user;

in this step, the filtered WiFi RF signal is transmitted to the wireless network through the WiFi directional antenna; through the device supporting WiFi, such as a mobile phone or PC with a WiFi network card, the WiFi RF signals received by the devices is converted into data information that can be identified by the user, such that the user can view or use the data information.

Figure 4:
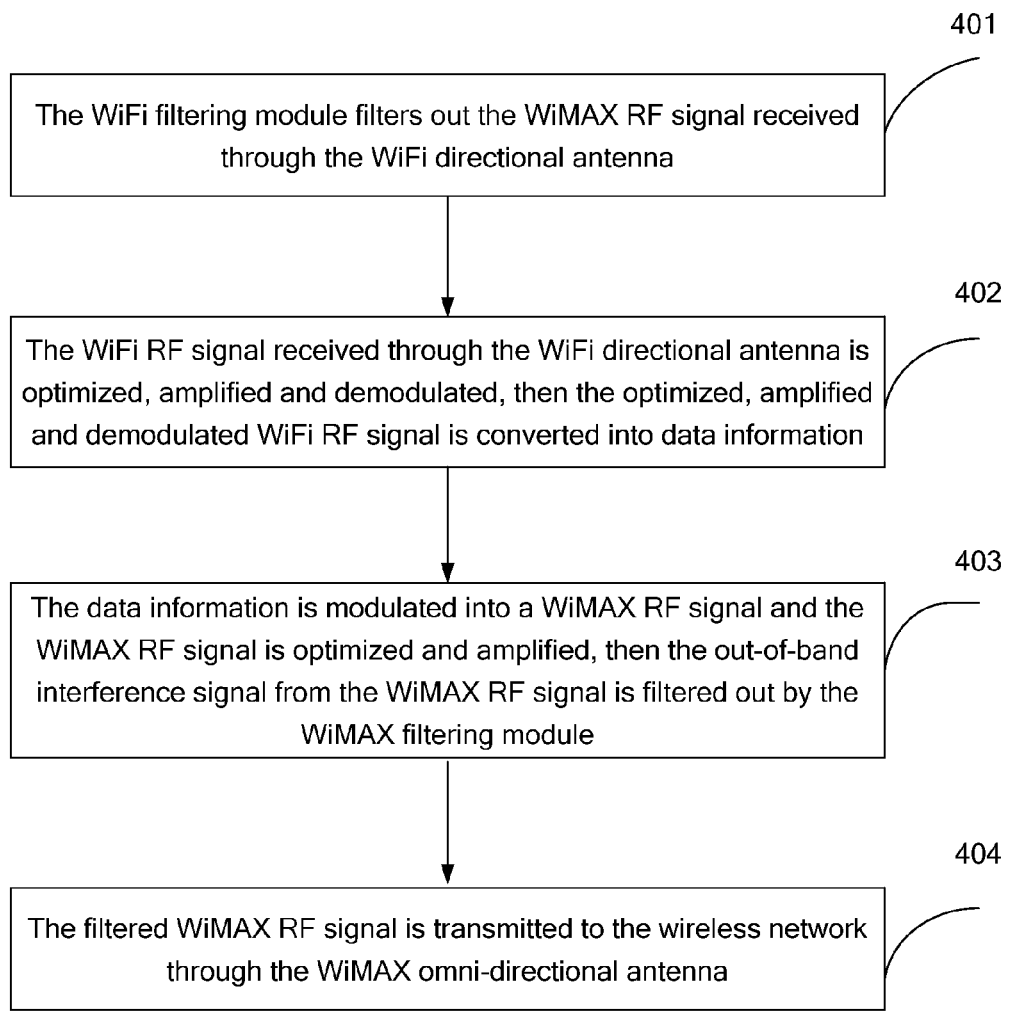
FIG. 4 shows a flow chart of the method for suppressing the interference caused by coexistence of WiMAX and WiFi according to the disclosure, when the user transmits an RF signal to the wireless network by using the apparatus.

When the user transmits the RF signal to the wireless network by using the apparatus, as shown in FIG. 4, the method for suppressing interference in the disclosure comprises the following steps:

step 401: the WiFi filtering module filters out the WiMAX RF signal received through the WiFi directional antenna;

in this step, when the WiFi directional antenna receives the WiFi RF signal from the device supporting WiFi, as the band interval between the frequency bands used by WiMAX and WiFi is small, the WiFi RF signal received through the WiFi directional antenna may include the WiMAX RF signal, the WiMAX RF signal is filtered out by the WiFi filtering module, specifically like a WiFi band pass filter or a WiMAX band stop filter, to suppress the WiMAX RF signal effectively and prevent the WiMAX RF signal from interfering the receiving system of the WiFi RF module;

step 402: the WiFi RF signal received through the WiFi directional antenna is optimized, amplified and demodulated, then the optimized, amplified and demodulated WiFi RF signal is converted into data information;

in this step, the filtered WiFi RF signal is optimized and amplified by the WiFi RF module, the optimized and amplified WiFi RF signal is demodulated, by the WiFi integrated processor, into data information that can be identified by the user, and the data information is transmitted to the application processing modules; the application processing modules converts the received data information into data information that can be identified and processed properly by the WiMAX integrated processor and transmits the data information to the WiMAX integrated processor;

steps 403-404: the data information is modulated into WiMAX RF signal and the WiMAX RF signal is optimized and amplified, then the out-of-band interference signal from the WiMAX RF signal is filtered out by the WiMAX filtering module, and the filtered WiMAX RF signal is transmitted to the wireless network through the WiMAX omni-directional antenna;

in this step, the WiMAX integrated processor modulates the received data information, and converts the data information into the WiMAX RF signal that can be amplified and transmitted by the WiMAX RF module, the WiMAX RF signal is optimized and amplified by the WiMAX RF module and transmitted to the WiMAX filtering modules; the WiMAX filtering module, specifically like a WiMAX band pass filter or a WiFi band stop filter, filters the received WiMAX RF signal, to effectively reduce the out-of-band interference signal from the WiMAX RF signal resulted from poor out-of-band suppression of the WiMAX RF module, and the filtered WiMAX RF signal is transmitted to the wireless network through the WiMAX omni-directional antenna.

The above mentioned are only preferred embodiments of the disclosure and are not intended to limit the protection scope of the disclosure; any modifications, equivalent replacements and improvements done within the spirit and principle of the disclosure should be included within the protection scope of the disclosure.

The invention claimed is:

1. An apparatus for suppressing interference caused by coexistence of World Interoperability for Microwave Access (WiMAX) and Wireless Fidelity (WiFi), by which a user receives a Radio Frequency (RF) signal from a wireless network and transmits an RF signal to the wireless network, comprising: a WiMAX antenna, a WiMAX filtering module, a WiFi antenna and a WiFi filtering module; wherein the WiMAX antenna is configured to receive a WiMAX RF signal from the wireless network and transmit the WiMAX RF signal to the wireless network;

the WiMAX filtering module is configured to filter out a WiFi RF signal received through the WiMAX antenna, and filter out an out-of-band interference signal from the WiMAX RF signal from a WiMAX RF module;

the WiFi antenna is configured to transmit a WiFi RF signal to the user; and receive the WiFi RF signal transmitted by the user;

the WiFi filtering module is configured to filter out an out-of-band interference signal from the WiFi RF signal from a WiFi RF module, and filter out the WiMAX RF signal received through the WiFi antenna from the user.

2. The apparatus according to claim 1, wherein the WiMAX filtering module is specifically a WiMAX band pass filter or a WiFi band stop filter; the WiFi filtering module is specifically a WiFi band pass filter or a WiMAX band stop filter.

3. The apparatus according to claim 2, further comprising: the WiMAX RF module, a WiMAX integrated processor, a WiFi integrated processor, the WiFi RF module, an application processing module, a storage module and a power management module; wherein the WiMAX RF module is configured to optimize and amplify uplink and downlink WiMAX RF signals;

the WiMAX integrated processor is configured to demodulate the downlink WiMAX RF signal optimized and amplified by the WiMAX RF module into data information and transmit the data information to the application processing module, and modulate the data information from the application processing module into the uplink WiMAX RF signal and transmit the uplink WiMAX RF signal to the WiMAX RF module;

the WiFi integrated processor is configured to modulate the data information from the application processing module into a downlink WiFi RF signal and transmit the downlink WiFi RF signal to the WiFi RF module, and demodulate an uplink WiFi RF signal optimized and amplified by the WiFi RF module into data information and transmit the data information to the application processing module;

the WiFi RF module is configured to optimize and amplify the uplink and downlink WiFi RF signals;

the application processing module is configured to convert the data information from the WiMAX integrated processor into data information that the WiFi integrated processor is capable of properly identifying and processing, and transmit the data information to the WiFi integrated processor; and convert the data information from the WiFi integrated processor into data information that the WiMAX integrated processor is capable of properly identifying and processing and transmit the data information to the WiMAX integrated processor;

the storage module is configured to store software required for operation of the application processing module and drivers of the respective modules; and the power management module is configured to transform an external power to stable powers required by the respective modules.

4. The apparatus according to claim 3, wherein the WiMAX RF module supports RF signal processing for 2.5 GHz-band-WiMAX and 2.3 GHz-band-WiMAX; the WiFi RF module supports RF signal processing for 2.4 GHz-band-WiFi.

5. The apparatus according to claim 3, wherein the application processing module is further configured to call a program in the storage module when the device is started, to load the drivers of the respective modules.

6. The apparatus according to claim 1, wherein the WiMAX antenna is specifically a WiMAX omni-directional antenna; the WiFi antenna is specifically a WiFi directional antenna.

7. The apparatus according to claim 6, wherein a position difference exists between the WiFi directional antenna and the WiMAX omni-directional antenna, resulting in maximum horizontal and vertical distances between the WiFi directional antenna and the WiMAX omni-directional antenna, and the maximum horizontal and vertical distances ensure no overlap between the WiFi directional antenna and the WiMAX omni-directional antenna in their maximum radiation direction.

8. The apparatus according to claim 7, further comprising: the WiMAX RF module, a WiMAX integrated processor, a WiFi integrated processor, the WiFi RF module, an application processing module, a storage module and a power management module; wherein the WiMAX RF module is configured to optimize and amplify uplink and downlink WiMAX RF signals;

the WiMAX integrated processor is configured to demodulate the downlink WiMAX RF signal optimized and amplified by the WiMAX RF module into data information and transmit the data information to the application processing module, and modulate the data information from the application processing module into the uplink WiMAX RF signal and transmit the uplink WiMAX RF signal to the WiMAX RF module;

the WiFi integrated processor is configured to modulate the data information from the application processing module into a downlink WiFi RF signal and transmit the downlink WiFi RF signal to the WiFi RF module, and demodulate an uplink WiFi RF signal optimized and amplified by the WiFi RF module into data information and transmit the data information to the application processing module;

the WiFi RF module is configured to optimize and amplify the uplink and downlink WiFi RF signals;

the application processing module is configured to convert the data information from the WiMAX integrated processor into data information that the WiFi integrated processor is capable of properly identifying and processing, and transmit the data information to the WiFi integrated processor; and convert the data information from the WiFi integrated processor into data information that the WiMAX integrated processor is capable of properly identifying and processing and transmit the data information to the WiMAX integrated processor;

the storage module is configured to store software required for operation of the application processing module and drivers of the respective modules; and the power management module is configured to transform an external power to stable powers required by the respective modules.

9. The apparatus according to claim 8, wherein the WiMAX RF module supports RF signal processing for 2.5 GHz-band-WiMAX and 2.3 GHz-band-WiMAX; the WiFi RF module supports RF signal processing for 2.4 GHz-band-WiFi.

10. The apparatus according to claim 8, wherein the application processing module is further configured to call a program in the storage module when the device is started, to load the drivers of the respective modules.

11. The apparatus according to claim 6, further comprising: the WiMAX RF module, a WiMAX integrated processor, a WiFi integrated processor, the WiFi RF module, an application processing module, a storage module and a power management module; wherein the WiMAX RF module is configured to optimize and amplify uplink and downlink WiMAX RF signals;

the WiMAX integrated processor is configured to demodulate the downlink WiMAX RF signal optimized and amplified by the WiMAX RF module into data information and transmit the data information to the application processing module, and modulate the data information from the application processing module into the uplink WiMAX RF signal and transmit the uplink WiMAX RF signal to the WiMAX RF module;

the WiFi integrated processor is configured to modulate the data information from the application processing module into a downlink WiFi RF signal and transmit the downlink WiFi RF signal to the WiFi RF module, and demodulate an uplink WiFi RF signal optimized and amplified by the WiFi RF module into data information and transmit the data information to the application processing module;

the WiFi RF module is configured to optimize and amplify the uplink and downlink WiFi RF signals;

the application processing module is configured to convert the data information from the WiMAX integrated processor into data information that the WiFi integrated processor is capable of properly identifying and processing, and transmit the data information to the WiFi integrated processor; and convert the data information from the WiFi integrated processor into data information that the WiMAX integrated processor is capable of properly identifying and processing and transmit the data information to the WiMAX integrated processor;

the storage module is configured to store software required for operation of the application processing module and drivers of the respective modules; and the power management module is configured to transform an external power to stable powers required by the respective modules.

12. The apparatus according to claim 11, wherein the WiMAX RF module supports RF signal processing for 2.5 GHz-band-WiMAX and 2.3 GHz-band-WiMAX; the WiFi RF module supports RF signal processing for 2.4 GHz-band-WiFi.

13. The apparatus according to claim 11, wherein the application processing module is further configured to call a program in the storage module when the device is started, to load the drivers of the respective modules.

14. The apparatus according to claim 1, further comprising: the WiMAX RF module, a WiMAX integrated processor, a WiFi integrated processor, the WiFi RF module, an application processing module, a storage module and a power management module; wherein the WiMAX RF module is configured to optimize and amplify uplink and downlink WiMAX RF signals;

the WiMAX integrated processor is configured to demodulate the downlink WiMAX RF signal optimized and amplified by the WiMAX RF module into data information and transmit the data information to the application processing module, and modulate the data information from the application processing module into the uplink WiMAX RF signal and transmit the uplink WiMAX RF signal to the WiMAX RF module;

the WiFi integrated processor is configured to modulate the data information from the application processing module into a downlink WiFi RF signal and transmit the downlink WiFi RF signal to the WiFi RF module, and demodulate an uplink WiFi RF signal optimized and amplified by the WiFi RF module into data information and transmit the data information to the application processing module;

the WiFi RF module is configured to optimize and amplify the uplink and downlink WiFi RF signals;

the application processing module is configured to convert the data information from the WiMAX integrated processor into data information that the WiFi integrated processor is capable of properly identifying and processing, and transmit the data information to the WiFi integrated processor; and convert the data information from the WiFi integrated processor into data information that the WiMAX integrated processor is capable of properly identifying and processing and transmit the data information to the WiMAX integrated processor;

the storage module is configured to store software required for operation of the application processing module and drivers of the respective modules; and the power management module is configured to transform an external power to stable powers required by the respective modules.

15. The apparatus according to claim 14, wherein the WiMAX RF module supports RF signal processing for 2.5 GHz-band-WiMAX and 2.3 GHz-band-WiMAX; the WiFi RF module supports RF signal processing for 2.4 GHz-band-WiFi.

16. The apparatus according to claim 14, wherein the application processing module is further configured to call a program in the storage module when the device is started, to load the drivers of the respective modules.

17. A method for suppressing interference caused by coexistence of World Interoperability for Microwave Access (WiMAX) and Wireless Fidelity (WiFi), comprising:

when a user receives an RF signal from a wireless network by using the apparatus, filtering, by the WiMAX filtering module, out a WiFi RF signal received through a WiMAX antenna;

converting a WiMAX RF signal into a WiFi RF signal; then filtering, by the WiFi filtering module, out an out-of-band interference signal from the WiFi RF signal; and transmitting the filtered WiFi RF signal to the user through the WiFi antenna; and when the user transmits an RF signal to the wireless network by using the apparatus, filtering, by the WiFi filtering module, out a WiMAX RF signal received through the WiFi antenna from the user;

converting a WiFi RF signal into a WiMAX RF signal; then filtering, by the WiMAX filtering module, out an out-of-band interference signal from the converted WiMAX RF signal; and transmitting the filtered WiMAX RF signal to the wireless network through the WiMAX antenna.

18. The method according to claim 17, wherein converting the WiMAX RF signal into the WiFi RF signal comprises:

optimizing, amplifying, and demodulating the WiMAX RF signal received through the WiMAX antenna, and then converting the optimized, amplified and demodulated WiMAX RF signal into data information that the user is capable of identifying; converting the data information that the user is capable of identifying into data information that the WiFi integrated processor is capable of properly identifying and processing, modulating the data information that the WiFi integrated processor is capable of properly identifying and processing into a WiFi RF signal, optimizing and amplifying the modulated WiFi RF signal, and then transmitting the optimized and amplified WiFi RF signal to the WiFi filtering module.

19. The method according to claim 17, wherein converting the WiFi RF signal into the WiMAX RF signal comprises:

optimizing, amplifying, and demodulating the WiFi RF signal received through the WiFi antenna, and then converting the optimized, amplified and demodulated WiFi RF signal into data information that the user is capable of identifying; converting the data information that the user is capable of identifying into data information that the WiMAX integrated processor is capable of properly identifying and processing, modulating the data information that the WiMAX integrated processor is capable of properly identifying and processing into a WiMAX RF signal, optimizing and amplifying the modulated WiMAX RF signal, and then transmitting the optimized and amplified WiMAX RF signal to the WiMAX filtering module.

* * * * *